United States Patent
Kang et al.

(10) Patent No.: US 10,957,018 B2
(45) Date of Patent: Mar. 23, 2021

(54) APPLICATION PROCESSOR FOR DETERMINING DATA TRANSMISSION ORDER BASED ON POSITION OF DISPLAY AND DEVICES INCLUDING THE SAME

(71) Applicants: Eun Ji Kang, Yongin-si (KR); Hoon Mo Yang, Hwaseong-si (KR); Jong Ho Roh, Yongin-si (KR)

(72) Inventors: Eun Ji Kang, Yongin-si (KR); Hoon Mo Yang, Hwaseong-si (KR); Jong Ho Roh, Yongin-si (KR)

(73) Assignee: SAMSUNG ELECTRONICS CO., LTD.

( * ) Notice: Subject to any disclaimer, the term of this patent is extended or adjusted under 35 U.S.C. 154(b) by 532 days.

(21) Appl. No.: 14/809,149

(22) Filed: Jul. 24, 2015

(65) Prior Publication Data

US 2016/0093024 A1 Mar. 31, 2016

(30) Foreign Application Priority Data

Sep. 25, 2014 (KR) .......................... 10-2014-0128461

(51) Int. Cl.
*G06F 1/16* (2006.01)
*G06T 3/60* (2006.01)
(Continued)

(52) U.S. Cl.
CPC .............. *G06T 3/60* (2013.01); *G06F 1/1618* (2013.01); *G06F 1/1641* (2013.01);
(Continued)

(58) Field of Classification Search
CPC .................................................... G06F 1/1652
See application file for complete search history.

(56) References Cited

U.S. PATENT DOCUMENTS

2004/0239258 A1 12/2004 Seki
2007/0070470 A1* 3/2007 Takami ................. G06F 17/212
358/527

(Continued)

FOREIGN PATENT DOCUMENTS

CN 1573873 A 2/2005
JP 2007110676 A 4/2007
(Continued)

*Primary Examiner* — Matthew Salvucci
(74) *Attorney, Agent, or Firm* — Renaissance IP Law Group LLP

(57) ABSTRACT

A portable electronic device comprises a double-sided display including a first display side and a second display side formed on a side opposite the first display side; a direct memory access (DMA) controller configured to read first image data from a memory; at least one sensor configured to detect at least one of a position change of the double-sided display and a movement of a user's pupil and to output a detection signal; a status signal generator configured to interpret the detection signal output and to output a status signal; a transmission order determiner configured to receive the first image data from the DMA controller, to determine a transmission order of the first image data based on the status signal, and to output second image data corresponding to the determined transmission order; and a display driver integrated circuit (IC) configured to transmit the second image data to the display.

20 Claims, 18 Drawing Sheets

(51) Int. Cl.
*G06F 3/01* (2006.01)
*G09G 5/00* (2006.01)
*G06F 3/03* (2006.01)

(52) U.S. Cl.
CPC .......... *G06F 1/1677* (2013.01); *G06F 1/1686* (2013.01); *G06F 1/1694* (2013.01); *G06F 3/013* (2013.01); *G06F 3/0304* (2013.01); *G09G 5/00* (2013.01); *G06F 1/1652* (2013.01); *G06F 2200/1614* (2013.01)

(56) References Cited

U.S. PATENT DOCUMENTS

| | | | |
|---|---|---|---|
| 2010/0064536 | A1 | 3/2010 | Caskey et al. |
| 2010/0085274 | A1 | 4/2010 | Kilpatrick, II et al. |
| 2010/0277443 | A1* | 11/2010 | Yamazaki ............ G06F 1/1616 |
| | | | 345/204 |
| 2013/0127918 | A1 | 5/2013 | Kang et al. |
| 2014/0049464 | A1 | 2/2014 | Kwak et al. |
| 2014/0062856 | A1 | 3/2014 | Lu et al. |
| 2014/0347264 | A1* | 11/2014 | Lee .................... G06F 15/0291 |
| | | | 345/156 |

FOREIGN PATENT DOCUMENTS

| | | |
|---|---|---|
| JP | 2013196623 | 9/2013 |
| JP | 2013247482 | 12/2013 |
| KR | 2010023256 | 3/2010 |
| KR | 1063882 | 9/2011 |
| KR | 2013127122 | 11/2013 |
| KR | 2014028257 | 3/2014 |
| KR | 2014062280 | 5/2014 |
| KR | 20140094658 A | 7/2014 |

\* cited by examiner

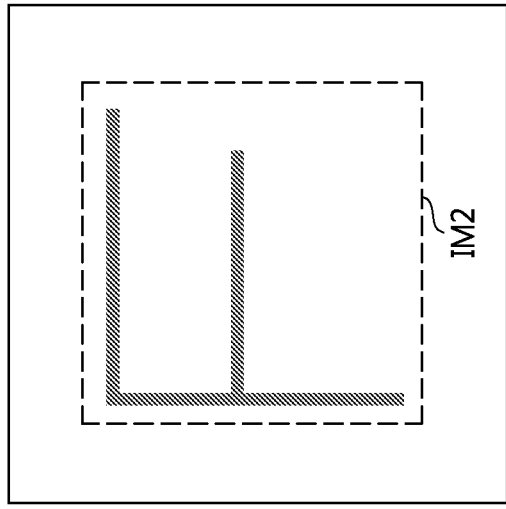
FIG. 8A
FIG. 8B
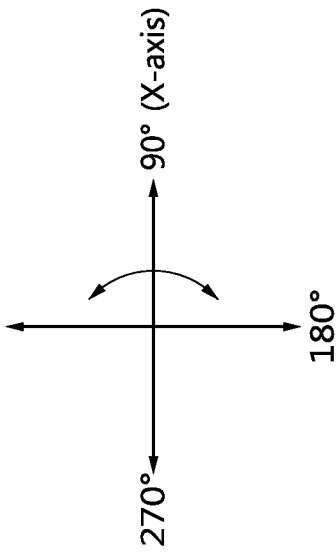
FIG. 8C
FIG. 8D

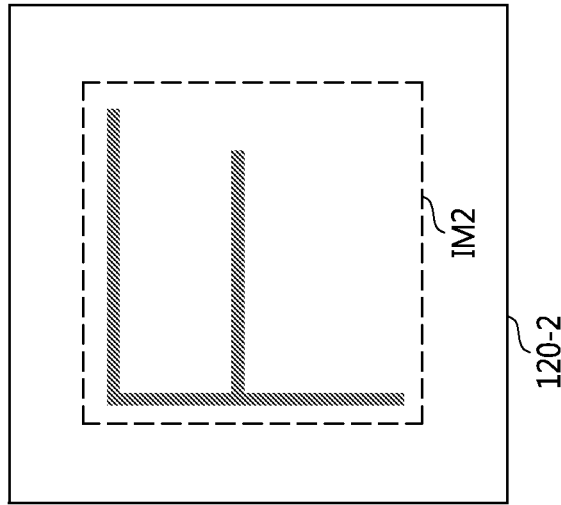
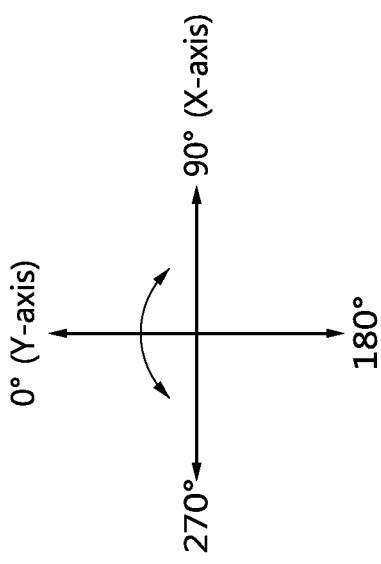
FIG. 9A
FIG. 9B
FIG. 9C
FIG. 9D

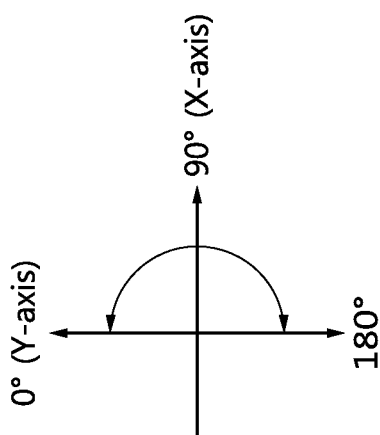

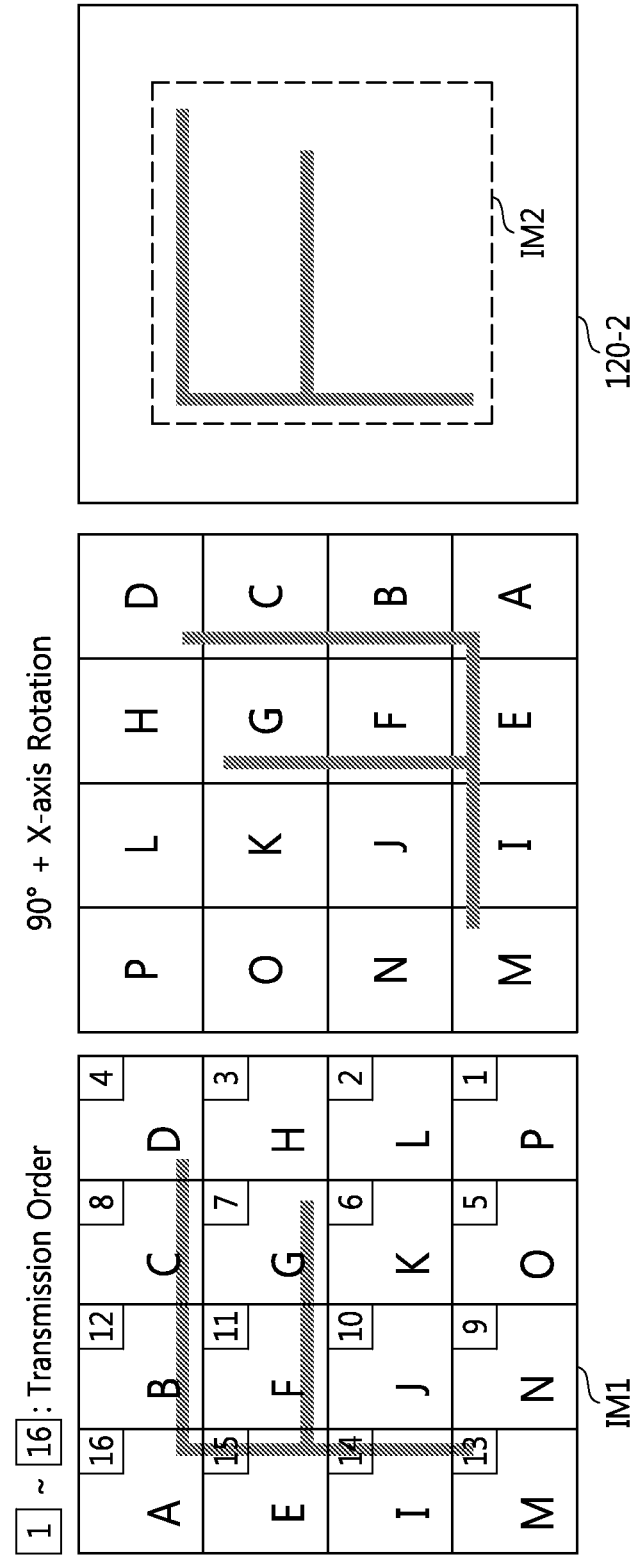

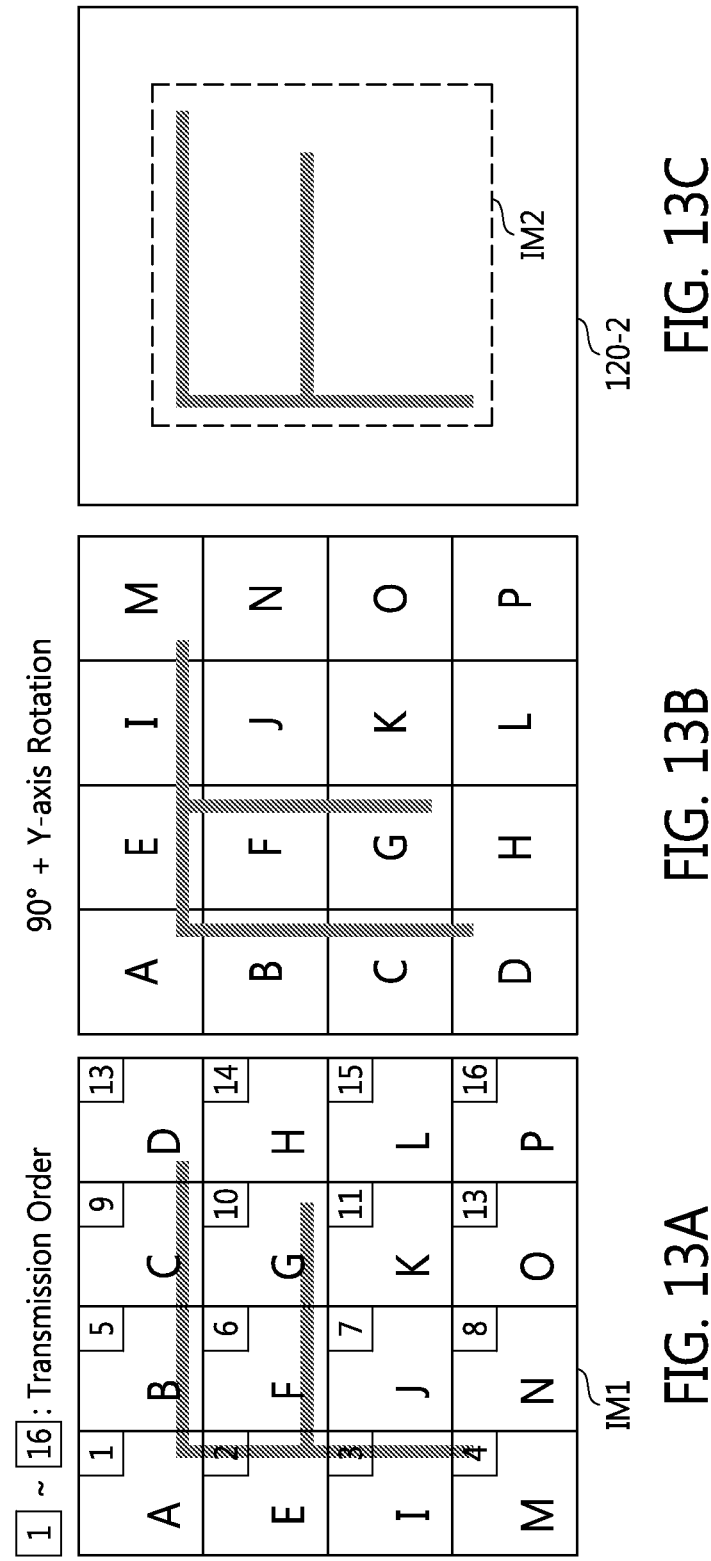

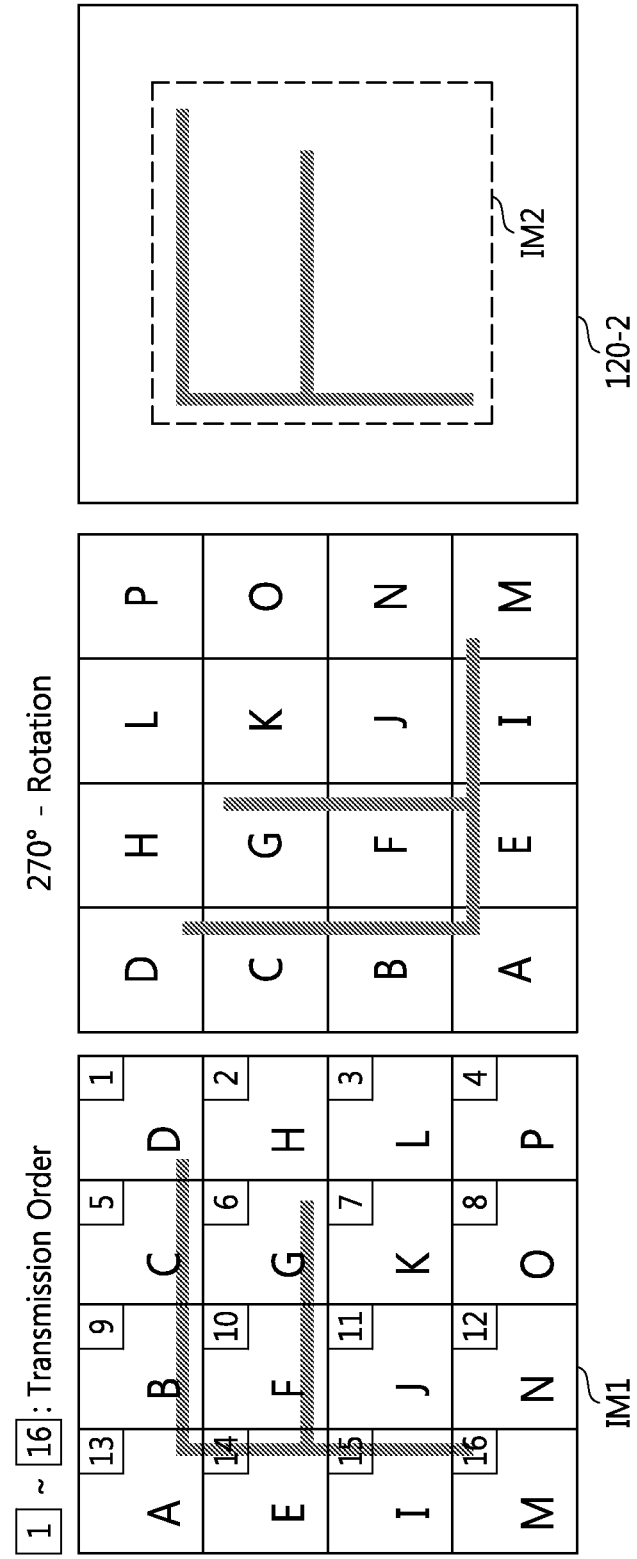

FIG. 16

APPLICATION PROCESSOR FOR DETERMINING DATA TRANSMISSION ORDER BASED ON POSITION OF DISPLAY AND DEVICES INCLUDING THE SAME

CROSS-REFERENCE TO RELATED APPLICATIONS

This application claims priority under 35 U.S.C. § 119(a) from Korean Patent Application No. 10-2014-0128461 filed on Sep. 25, 2014, the disclosure of which is hereby incorporated by reference in its entirety.

BACKGROUND

Embodiments disclosed herein relate to an integrated circuit, and more particularly, to an application processor for determining a data transmission order based on at least a fold and rotation of a double-sided display and/or a movement of a user's eye, and devices including the same.

A flexible display is a display device that can be bent. A flexible display is manufactured by replacing a glass substrate wrapping around liquid crystals with a plastic substrate in an existing liquid crystal display (LCD) or organic light emitting diode (OLED) display, and thus has flexibility to be folded. A flexible display is thin, lightweight and shock-resistant and is bendable or foldable, and can be thus manufactured in various forms.

Due to lightweight and shock-resistant properties, a flexible display is used for a mobile phone, a personal digital assistant (PDA), a MP3 player, and so on. A conventional flexible display, however, has only one side for display. As a result, when a flexible display is folded, it may not be able to be usable.

SUMMARY

According to some embodiments disclosed herein, there is provided a portable electronic device including a double-sided display including a first display side and a second display side formed on a side opposite the first display side; a memory configured to store first image data; a direct memory access (DMA) controller configured to read the first image data from the memory; at least one sensor configured to detect at least one among a position change of the double-sided display and movement of a user's pupil and to output a detection signal; a status signal generator configured to interpret the detection signal output from the at least one sensor and to output a status signal; a transmission order determiner configured to receive the first image data from the DMA controller and the status signal, to determine a transmission order of the first image data based on the status signal, and to output second image data corresponding to the determined transmission order; and a display driver integrated circuit (IC) configured to transmit the second image data to the display.

The transmission order determiner may transmit the second image data to the display driver IC based on the status signal indicating a first position to display the second image data on the first display side in the order the same as order in which the first image data have been received. The transmission order determiner may transmit the second image data to the display driver IC based on the status signal indicating a second position to display the second image data on the second display side in the order reverse to the order in which the first image data have been received.

Alternatively, the transmission order determiner may transmit the second image data to the display driver IC based on the status signal indicating a first position to display the second image data on the first display side in the order the same as order in which the first image data have been received. The transmission order determiner may transmit the second image data to the display driver IC based on the status signal indicating a second position to display the second image data on the second display side in the order different from the order in which the first image data have been received.

The first image data may include pixels. The transmission order determiner may determine the transmission order of the pixels of the first image data based on the status signal and output the second image data including pixels corresponding to the determined transmission order.

The transmission order determiner may include a display control logic circuit including a line buffer, an image rotator, and a demultiplexer configured to output the first image data from the DMA controller to one of the image rotator and the line buffer in response to a selection signal. The image rotator may determine the transmission order of the first image data based on the status signal and may output the second image data. The display control logic circuit may write the first image data output from the demultiplexer to the line buffer or may output the second image data received from the image rotator.

The image rotator may output the second image data in the order the same as or reverse to the order in which the first image data have been received based on the status signal. Alternatively, the image rotator may output the second image data in the order the same as or different from the order in which the first image data have been received based on the status signal.

The display control logic circuit may read the first image data that have been written to the line buffer in the same order as a write order based on the status signal and may output the first image data that have been read as the second image data.

The display control logic circuit may read the first image data that have been written to the line buffer in the order reverse to a write order based on the status signal and may output the first image data that have been read as the second image data. The double-sided display may be a transparent display or a transparent flexible display.

According to other embodiments disclosed herein, there is provided an application processor including a DMA controller configured to read first image data from a memory; a status signal generator configured to interpret a detection signal output from a sensor and to output a status signal; and a transmission order determiner configured to receive the first image data from the DMA controller and the status signal, to determine a transmission order of the first image data based on the status signal, and to output second image data corresponding to the determined transmission order.

The transmission order determiner may flip the first image data based on the status signal and may output the second image data obtained from the flipping. The transmission order determiner may rotate the first image data based on the status signal and may output the second image data obtained from the rotation.

According to further embodiments disclosed herein, there is provided a system on chip (SoC) including a memory configured to store first image data; a DMA controller configured to read the first image data from the memory; a status signal generator configured to interpret a detection signal output from a sensor and to output a status signal; and a transmission order determiner configured to receive the first image data from the DMA controller and the status signal, to determine a transmission order of the first image data based on the status signal, and to output second image data corresponding to the determined transmission order.

Embodiments disclosed herein provide a system comprising a status signal generator and an image rotator. The status signal generator is configured to output a status signal to indicate one of a plurality of positions of at least one double-sided display. The image rotator is coupled to the position signal, and the image rotator is configured to receive image data in a read order, and to output the image data in a transmission order in which the transmission order is the same as the read order if the status signal indicates a first position of the at least one double-sided display, and in which the transmission order is a reverse of the read order if the status signal indicates a second position of the at least one double-sided display.

In some exemplary embodiments, the plurality of positions of the at least one double-sided display comprises an unfolded position and a folded position, and the first position comprises the unfolded position and the second position comprises the folded position. In some exemplary embodiments, the at least one double-sided display comprises a double-sided display, a transparent double-sided display, a double-sided foldable display, a dual-sided foldable display, a double-sided foldable flexible display, or a dual-sided foldable flexible display. In some exemplary embodiments, the at least one double-sided display comprises at least two double-sided displays.

In some exemplary embodiments, the status signal generator is further configured to output the status signal in response to at least one of an angle between the at least two double-sided displays, an orientation of one of the at least two double-sided displays, a rotation of one of the at least two double-sided displays or a rotation direction of one of the at least two double-sided displays.

In some exemplary embodiments, the system further comprises a direct memory access (DMA) controller and a display driver. The DMA controller comprises an output coupled to the image rotator, and the DMA controller is configured to output the image data to the image rotator. The display driver is configured to receive the image data.

In some exemplary embodiments, the system comprises part of an electronic device comprising the at least one double-sided display.

Exemplary embodiments disclosed herein provide a System on a Chip (SOC) comprising a direct memory access (DMA) controller, a status signal generator, and an image rotator. The DMA controller is configured to output image data in a read order. The status signal generator is configured to output a status signal to indicate one of a plurality of positions of at least one double-sided display in which the plurality of positions comprise at least an unfolded position and a folded position, and in which a first position comprises the unfolded position and a second position comprises the folded position. The image rotator is coupled to the status signal generator, and the image rotator is configured to receive the image data in the read order, and to output the image data in a transmission order, in which the transmission order is the same as the read order if the status signal indicates the first position of the at least one double-sided display, and in which the transmission order is a reverse of the read order if the status signal indicates the second position of the at least one double-sided display.

In some exemplary embodiments, the at least one double-sided display comprises a double-sided display, a transparent double-sided display, a double-sided foldable display, a dual-sided foldable display, a double-sided foldable flexible display, or a dual-sided foldable flexible display. In some exemplary embodiments, the at least one double-sided display comprises at least two double-sided displays.

In some exemplary embodiments, the status signal generator is further configured to output the status signal in response to at least one of an angle between the at least two double-sided displays, an orientation of one of the at least two double-sided displays, a rotation of one of the at least two double-sided displays or a rotation direction of one of the at least two double-sided displays.

In some exemplary embodiments, the SoC further comprises a display driver configured to receive the image data from the image rotator and to drive the at least one double-sided display with the image data received from the image rotator.

In some exemplary embodiments, the SoC comprises part of an electronic device comprising the at least one double-sided display. In some exemplary embodiments, the electronic device comprises a computing device, a personal digital assistant (PDA), a laptop computer, a mobile computer, a web tablet, a wireless phone, a cell phone, a smart phone, a digital music player, or a wireline or wireless electronic device.

Some exemplary embodiments disclosed herein provide a system comprising at least one double-sided display, a status signal generator and an image rotator. The status signal generator is configured to output a first status signal to indicate an unfolded position of the at least one double-sided display and a second status signal to indicate a folded position of the at least one double-sided display. The image rotator is coupled to the status signal generator, and the image rotator is configured to receive image data in a read order, and to output the image data in a transmission order in which the transmission order is the same as the read order if the status signal generator outputs the first position signal, and in which the transmission order is a reverse of the read order if the status signal generator outputs the second position signal.

In some exemplary embodiments, the at least one double-sided display comprises a double-sided display, a transparent double-sided display, a double-sided foldable display, a dual-sided foldable display, a double-sided foldable flexible display, or a dual-sided foldable flexible display. In some exemplary embodiments, the at least one double-sided display comprises at least two double-sided displays.

In some exemplary embodiments, the status signal generator is further configured to output the first status signal or the second status signal in response to at least one of an angle between the at least two double-sided displays, an orientation of one of the at least two double-sided displays, a rotation of one of the at least two double-sided displays or a rotation direction of one of the at least two double-sided displays.

In some exemplary embodiments, the system comprises part of an electronic device comprising the at least one double-sided display. In some exemplary embodiments, the electronic device comprises a computing device, a personal digital assistant (PDA), a laptop computer, a mobile computer, a web tablet, a wireless phone, a cell phone, a smart phone, a digital music player, or a wireline or wireless electronic device.

Some exemplary embodiments disclosed herein provide a method comprising: generating a status signal to indicate an unfolded position or a folded position of at least one double-sided display; receiving image data from a memory in a read order; and outputting the image data in a transmission order to the at least one double-sided display in which the transmission order is the same as the read order if the status signal indicates the unfolded position of the at least one double-sided display, and in which the transmission order is a reverse of the read order if the status signal indicates the folded position of the at least one double-sided display.

In some exemplary embodiments, the at least one double-sided display comprises a double-sided display, a transparent double-sided display, a double-sided foldable display, a dual-sided foldable display, a double-sided foldable flexible display, or a dual-sided foldable flexible display. In some exemplary embodiments, the at least one double-sided display comprises at least two double-sided displays. In some exemplary embodiments, the at least one double-sided display comprises part of an electronic device. In some exemplary embodiments, the electronic device comprises a computing device, a personal digital assistant (PDA), a laptop computer, a mobile computer, a web tablet, a wireless phone, a cell phone, a smart phone, a digital music player, or a wireline or wireless electronic device.

Some exemplary embodiments provide at least one non-transitory machine-readable medium comprising a plurality of instructions that in response to being executed on a computing device, result in at least the following: generating a status signal to indicate an unfolded position or a folded position of at least one double-sided display; receiving image data from a memory in a read order; and outputting the image data in a transmission order to the at least one double-sided display in which the transmission order is the same as the read order if the status signal indicates the unfolded position of the at least one double-sided display, and in which the transmission order is a reverse of the read order if the status signal indicates the folded position of the at least one double-sided display.

BRIEF DESCRIPTION OF THE DRAWINGS

The above and other features and advantages of the subject matter disclosed herein will become more apparent by describing in detail exemplary embodiments thereof with reference to the attached drawings in which:

FIGS. 8A-8C respective depict a transmission order that first data IM1 is read by an image rotator, an arrangement of pixels read in the transmission order, and an arrangement of second data IM2 displayed on a second display side of a double-sided display if the double-sided display is folded and rotated around the X-axis (FIG. 8D) or if the double-sided display is rotated around the X-axis and then folded according to some embodiments disclosed herein;

FIG. 8D depicts an indication of a double-sided display being folded and rotated around the X-axis or of the double-sided display being rotated around the X-axis and then folded with respect to reference axes X and Y;

FIGS. 9A-9C respectively depict a transmission order that first data IM1 is read by an image rotator, an arrangement of pixels read in the transmission order, and an arrangement of second data IM2 displayed on a second display side of a double-sided display if the double-sided display is folded and rotated around the Y-axis (FIG. 9D) or if the double-sided display is rotated around the Y-axis and then folded according to some embodiments disclosed herein;

FIG. 9D depicts an indication of a double-sided display being folded and rotated around the Y-axis or of a double-sided display being rotated around the Y-axis and then folded with respect to reference axes X and Y;

FIGS. 11A-11C respectively depict a transmission order that first data IM1 is read by an image rotator, an arrangement of pixels read in the transmission order, and an arrangement of second data IM2 displayed on a second display side of a double-sided display if the double-sided display is folded and rotated 180 degrees or if the double-sided display is rotated 180 degrees and then folded according to embodiments disclosed herein;

FIG. 11D depicts an indication of a double-sided display being folded and rotated 180 degrees or of a double-sided display being rotated 180 degrees and then folded with respect to reference axes X and Y;

FIGS. 12A-12C respectively depict a transmission order that first data IM1 is read by an image rotator, an arrangement of pixels read in the transmission order, and an arrangement of second data IM2 displayed on a second display side of a double-sided display if the double-sided display is folded and rotated 90 degrees and then rotated around an X-axis or if the double-sided display is rotated 90 degrees, rotated around the X-axis, and then folded according to embodiments disclosed herein;

FIGS. 13A-13C respectively depict a transmission order that first data IM1 is read by an image rotator, an arrangement of pixels read in the transmission order, and an arrangement of second data IM2 displayed on a second display side of a double-sided display if the double-sided display is folded and rotated 90 degrees and then rotated around the Y-axis or if the double-sided display is rotated 90 degrees, rotated around the Y-axis, and then folded according to embodiments disclosed herein;

Figure 1A:
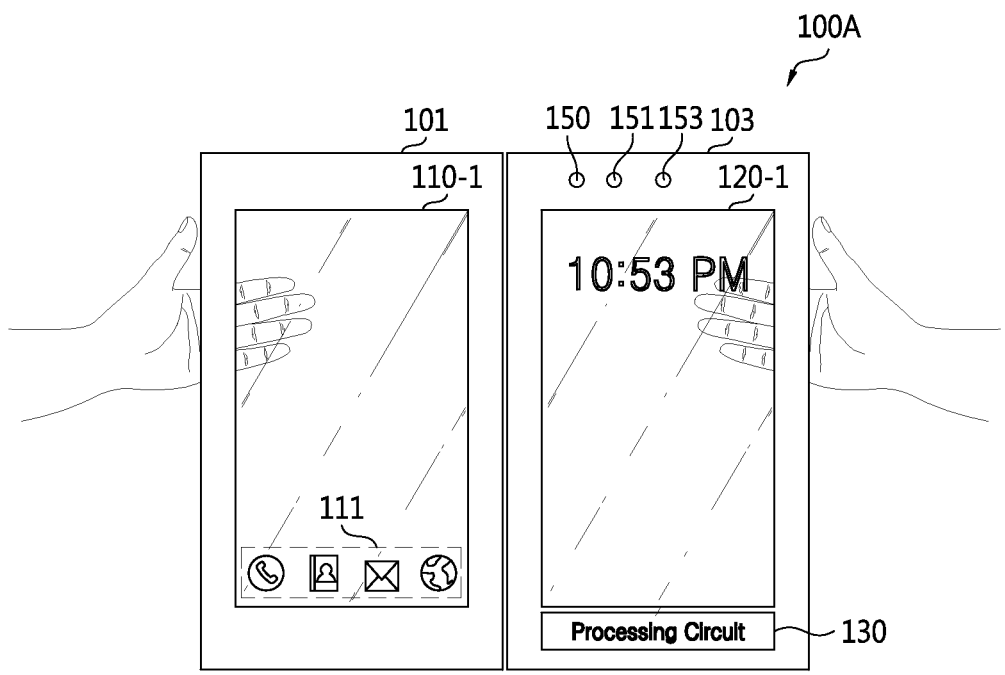
FIGS. 1A and 1B respectively depict a front view and a bottom view of a type of fold condition of double-sided displays that are included in a display system according to some embodiments disclosed herein.
Figure 3A:
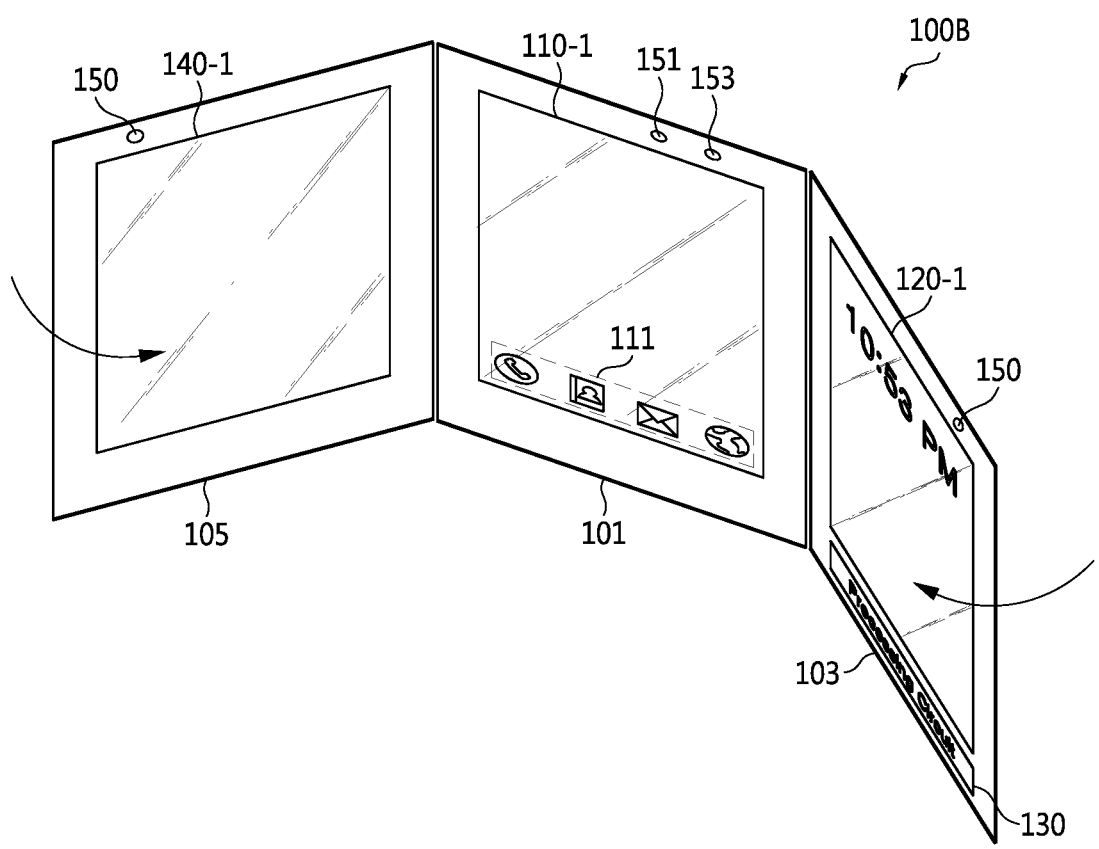
FIGS. 3A and 3B respectively depict a front view and a bottom view of a type of fold condition of double-sided displays that are included in a display system according to other embodiments disclosed herein.
Figure 3B:
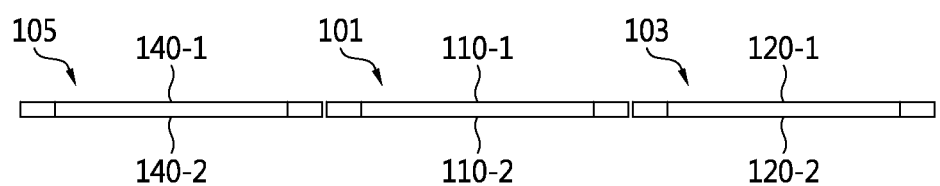
Figure 15:
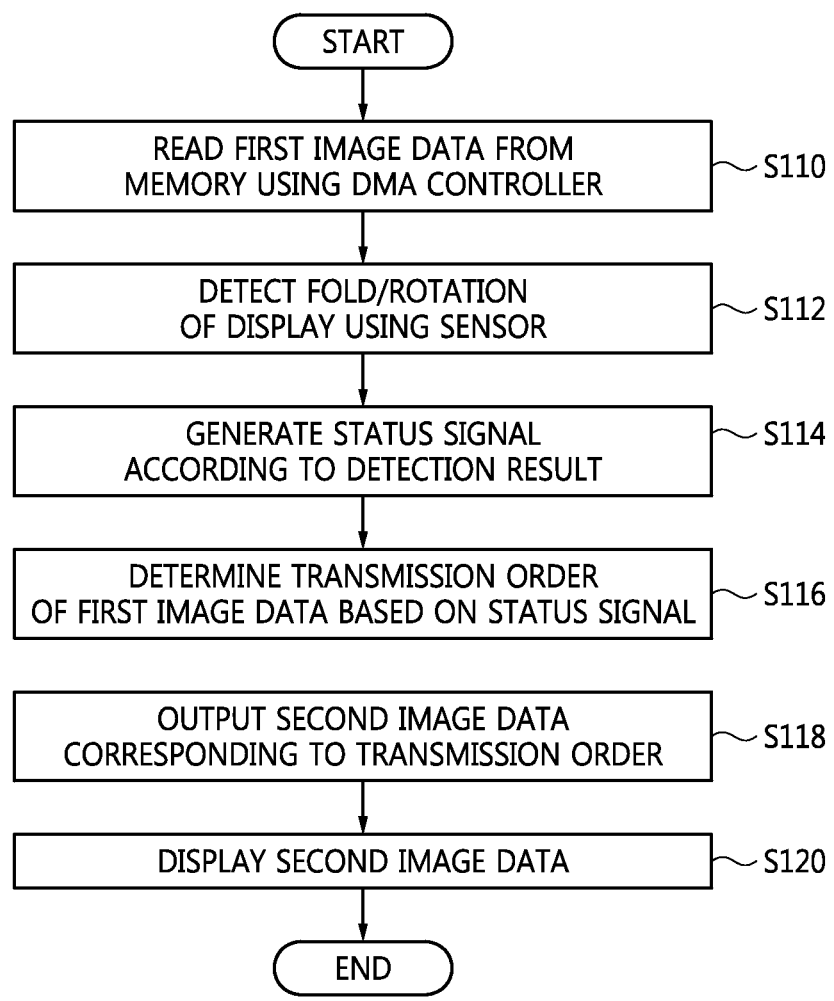
Figure 17:
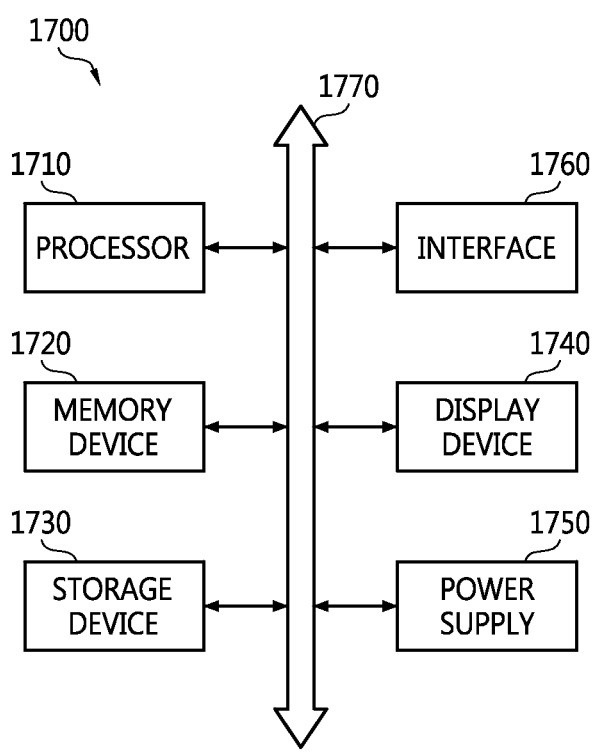
Figure 18:
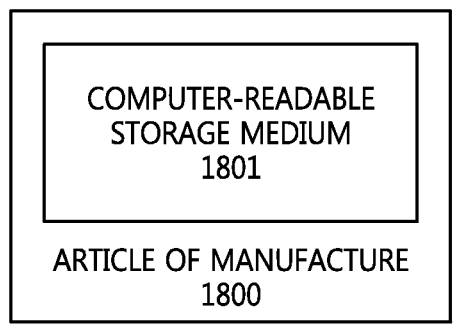

FIGS. 14A-14C respectively depict a transmission order that first data IM1 is read by an image rotator, an arrangement of pixels read in the transmission order, and an arrangement of second data IM2 displayed on a second display side of a double-sided display if a double-sided display is folded and rotated 270 degrees or if the double-sided display is rotated 270 degrees and then folded according to embodiments disclosed herein;

FIG. 15 is a flowchart of an exemplary embodiment of a method of operating the display system illustrated in FIG. 1A or 3B according to some embodiments disclosed herein;

Figure 16:
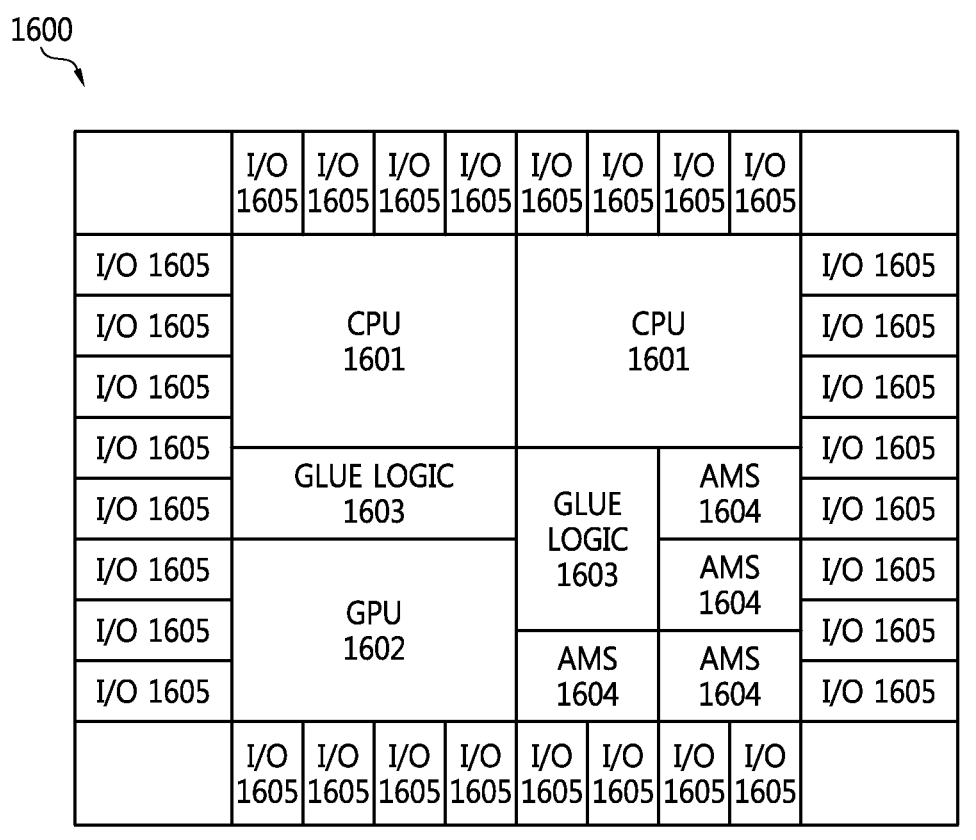

FIG. 16 depicts an exemplary arrangement of components of a System on a Chip (SOC) that comprises one or more processing circuits according to the subject matter disclosed herein;

FIG. 17 depicts a block diagram illustrating an exemplary mobile device comprising one or more double-sided displays according to exemplary embodiments disclosed herein; and FIG. 18 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

DETAILED DESCRIPTION OF THE EMBODIMENTS

The subject matter disclosed herein now will be described more fully hereinafter with reference to the accompanying drawings, in which exemplary embodiments are disclosed. The subject matter disclosed herein may, however, be embodied in many different forms and should not be construed as limited to the embodiments set forth herein. Rather, these embodiments are provided so that this disclosure will be thorough and complete, and will fully convey the scope of the claimed subject matter to those skilled in the art. In the drawings, the size and relative sizes of layers and regions may be exaggerated for clarity. Like numbers refer to like elements throughout. Additionally, as used herein, the word "exemplary" means "serving as an example, instance, or illustration." Any embodiment described herein as "exemplary" is not to be construed as necessarily preferred or advantageous over other embodiments.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1B:
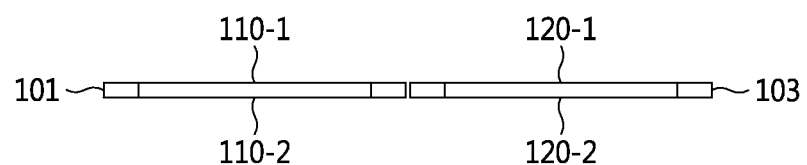
Figure 2:
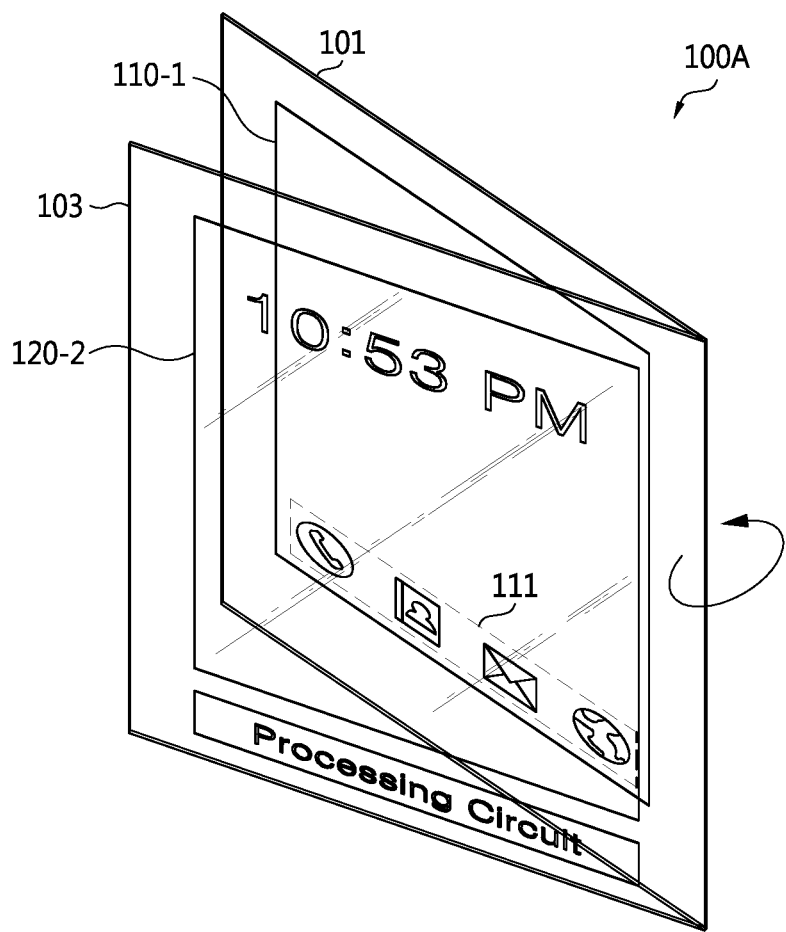
FIG. 2 depicts another type of fold condition of the double-sided displays that are included in the display system illustrated in FIGS. 1A and 1B.

FIGS. 1A and 1B respectively depict a front view and a bottom view of a type of fold condition of double-sided displays 101 and 103 that are included in a display system 100A according to some embodiments disclosed herein. FIG. 2 is a diagram of another type of fold condition of the double-sided displays 101 and 103 that are included in the display system 100A illustrated in FIGS. 1A and 1B. Types of fold conditions may include a flatness or an unfold, as shown in FIGS. 1A and 1B, and a fold, a continuous fold transforming from flatness to fold, or a half fold, as shown in FIG. 2.

Figure 4:
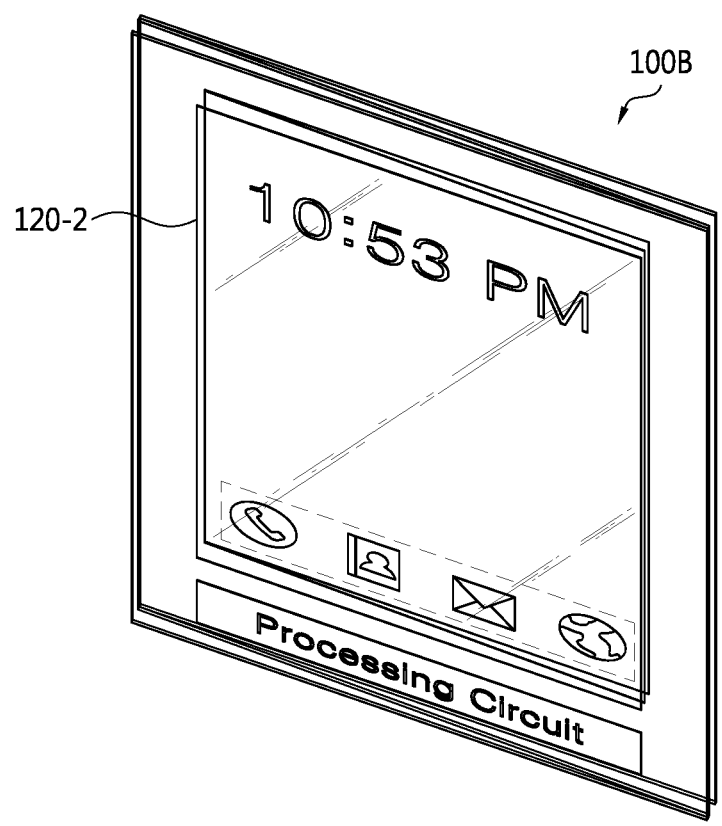
FIG. 4 depicts another type of fold condition of the double-sided displays that are included in the display system illustrated in FIGS. 3A and 3B.

Referring to FIGS. 1A and 1B, the display system 100A includes the first double-sided display 101 and the second double-sided display 103. Although the display system 100A including the two double-sided displays 101 and 103 is illustrated in FIG. 1A for convenience in the description, a display system may include only one double-sided display, may include three double-sided displays, as shown in FIGS. 3A, 3B and 4, or may include four or more double-sided displays in other embodiments disclosed herein. Here, the term "double-sided display or dual-sided display" as used herein covers a double-sided foldable display or a dual-sided foldable display or a double-sided foldable flexible display or a dual-sided foldable flexible display.

The display system 100A (or 100B in FIGS. 3A, 3B and 4) may be implemented as a television (TV), a laptop computer, a smart phone, a tablet personal computer (PC), a Mobile Internet Device (MID), a multimedia device, a wearable computer, an Internet of Things (IoT) device, an Internet of Everything (IoE) device, or an e-book.

The display system 100A includes the double-sided displays 101 and 103, and a processing circuit 130 that may be implemented in one (e.g., the second double-sided display 103) of the double-sided displays 101 and 103. Here, the processing circuit 130 may be a controller or a control device that controls the operations of both of the double-sided displays 101 and 103. The processing circuit 130 may include a battery (155 in FIG. 5). Alternatively, the processing circuit 130 may be formed in both double-sided displays 101 and 103 in a distributed fashion.

Each of the first and second double-sided displays 101 and 103 may be implemented as a transparent double-sided display. The first double-sided display 101 includes two display sides 110-1 and 110-2. The display side 110-1 is on a side opposite the display side 110-2. Graphical user interfaces (GUIs) 111 may be displayed on the display side 110-1.

The second double-sided display 103 includes a first display side 120-1 and a second display side 120-2. The first display side 120-1 is on a side opposite the second display side 120-2.

As shown in FIG. 1A, display data (e.g., 10:53 PM) is displayed on the first display side 120-1 according to the operation of the processing circuit 130. As shown in FIG. 2, the display data (e.g., 10:53 PM) is displayed on the second display side 120-2 according to the operation of the processing circuit 130. In other words, even when the second double-sided display 103 is folded in, a user is allowed to see the display data (e.g., 10:53 PM) always displayed in one direction from the user's point of view.

At least one sensor 150 may detect an angle between the display sides 110-1 and 120-1, an orientation of the second double-sided display 103, a rotation of the second double-sided display 103, and/or a rotation direction of the second double-sided display 103 and may generate a detection signal according to the detection result. A sensor 151 may detect or track the movement or position of a user's eye or pupil and may generate a detection signal. A sensor 153 may detect the ambient brightness of the display system 100A and generate a detection signal. For example, the sensor 153 may be a light sensor.

Although the sensors 150, 151, and 153 are formed in the second double-sided display 103 in the embodiments illustrated in FIG. 1A, sensors 150, 151 and 153 may be formed in at least one of the double-sided displays 101 and 103. The positions of the sensors 150, 151, and 153 may be variously modified in different embodiments disclosed herein.

FIGS. 3A and 3B respectively depict a front view and a bottom view a type of fold condition of double-sided displays 101, 103, and 105 that are included in a display system 100B according to other embodiments disclosed herein. FIG. 4 depicts another type of fold condition of the double-sided displays 101, 103, and 105 that are included in the display system 100B illustrated in FIGS. 3A and 3B.

Referring to FIGS. 3A and 3B, the display system 100B includes a first double-sided display 101, a second double-sided display 103, and a third double-sided display 105. The processing circuit 130 may be implemented in one (e.g., the second double-sided display 103) of the double-sided displays 101, 103, and 105. Alternatively, the processing circuit 130 may be formed in at least two of the double-sided displays 101, 103, and 105 in a distributed fashion. Each of the double-sided displays 101, 103, and 105 may be implemented as a transparent double-sided display.

The first double-sided display 101 includes two display sides 110-1 and 110-2. The display side 110-1 is on a side opposite the display side 110-2. The second double-sided display 103 includes two display sides 120-1 and 120-2. The display side 110-1 is on a side opposite the display side 110-2. The third double-sided display 105 includes two display sides 140-1 and 140-2. The display side 140-1 is opposite the display side 140-2.

As shown in FIG. 3A, display data (e.g., 10:53 PM) is displayed on the first display side 120-1 of the second double-sided display 103 according to the operation of the processing circuit 130. As shown in FIG. 4, the display data (e.g., 10:53 PM) is displayed on the second display side 120-2 of the second double-sided display 103 according to the operation of the processing circuit 130. In other words, even when the second double-sided display 103 is folded in, a user is allowed to see the display data (e.g., 10:53 PM) always displayed in one direction from the user's point of view.

Each of the double-sided displays 101, 103, and 105 may be implemented as a thin-film transistor liquid crystal display (TFT-LCD) or an Active-Matrix Organic Light Emitting Diode (AMOLED).

Although sensors 150 are respectively formed in the second and third double-sided displays 103 and 105 in the embodiments illustrated in FIG. 3A, they may be formed in at least any one of the double-sided displays 101, 103, and 105. Although the sensors 151 and 153 are formed in the first double-sided display 101 in the embodiments illustrated in FIG. 3A, the sensor 151 that detects the movement or position of a user's eye or pupil may be formed in at least any one of the double-sided displays 101, 103, and 105 in other embodiments. Although the light sensor 153 is formed in the first double-sided display 101 in the disclosed embodiments, the light sensor 153 may be formed in at least any one of the double-sided displays 101, 103, and 105 in other embodiments. Although the GUIs 111 are displayed on the display side 110-1 of the first double-sided display 101, the GUIs 111 may be displayed on any display side of at least one of the double-sided displays 101, 103, and 105.

Figure 5:
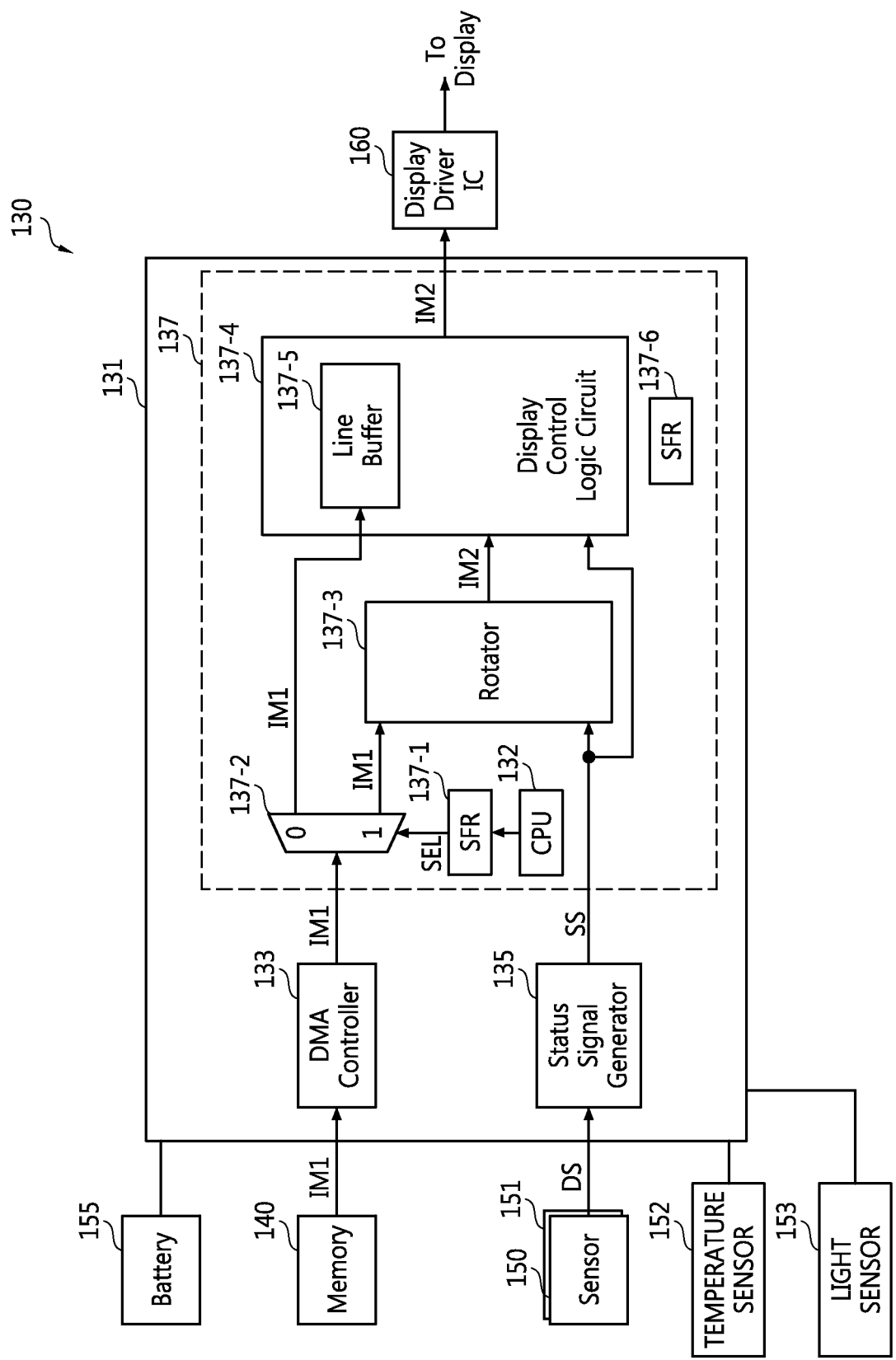
FIG. 5 depicts a block diagram of a processing circuit illustrated in FIG. 1A or 3B.

FIG. 5 is a functional block diagram of the processing circuit 130 illustrated in FIG. 1A or 3A. Referring to FIG. 5, the processing circuit 130, which may be referred to as a processing device, includes an integrated circuit (IC) 131, a memory 140, sensors 150, 151, 152, and 153, and a display driver IC 160. The processing circuit 130 may also include the battery 155. The battery 155 may provide operating voltages for the display system 100A or 100B.

The IC 131 may be implemented as an application processor (AP) or a mobile AP. The IC 131 and the memory 140 may be included in a System on Chip (SoC). Alternatively, the IC 131, the memory 140, and the sensors 150, 151, 152, and 153 may be included in the SoC. The temperature sensor 152 may detect an ambient temperature of the display system 100A or 100B or the IC 131 and generate a detection signal.

The memory 140 stores data (e.g., image data or display data) IM1 to be processed by the IC 131. The memory 140 may be formed with volatile or non-volatile memory. The volatile memory may be random access memory (RAM), dynamic RAM (DRAM), and/or static RAM (SRAM). The non-volatile memory may be electrically erasable programmable read-only memory (EEPROM), flash memory, magnetic RAM (MRAM), spin-transfer torque MRAM, ferroelectric RAM (FeRAM), phase-change RAM (PRAM), and/or resistive RAM (RRAM).

The IC 131 includes a central processing unit (CPU) 132, a direct memory access (DMA) controller 133, a status signal generator 135, and a transmission order determiner 137. The CPU 132 may, for example, be included in the transmission order determiner 137. The CPU 132 may control the operations of the DMA controller 133, the status signal generator 135, and/or the transmission order determiner 137.

The DMA controller 133 may read the first data IM1, e.g., image data or display data, from the memory 140. The first data IM1 includes pixels. The pixels may be data having an RGB format, a YUV format or a YCbCr format, but are not restricted to these format examples. When the DMA controller 133 includes an internal memory (not shown), all or some of the first data IM1 may be stored in the internal memory. The data storage capacity of the internal memory may vary with embodiments.

The status signal generator 135 may interpret (or analyze) a detection signal DS output from at least one of the sensors 150 and 151 and may output a status signal SS according to the interpretation result. For example, the status signal SS may also be determined depending on the movement of an eye or a pupil.

The transmission order determiner 137 may receive the first data IM1 output from the DMA controller 133 and the status signal SS output from the status signal generator 135, may determine a transmission order of the first data IM1 based on the status signal SS, and may output second data IM2, e.g., image data or display data, corresponding to the determined transmission order to the display driver IC 160.

In some embodiments, the transmission order determiner 137 may transmit the second data IM2 to the display driver IC 160 based on the status signal SS indicating a first position to display the second data IM2 on the first display side 120-1 in the same order as the first data IM1. Alternatively, the transmission order determiner 137 may transmit the second data IM2 to the display driver IC 160 based on the status signal SS indicating a second position to display the second data IM2 on the second display side 120-2 in reverse order to the first data IM1.

In other words, the transmission order determiner 137 may determine the transmission order of the pixels included in the first data IM1 based on the status signal SS indicating the first or second position and may generate the second data IM2 including the pixels arranged in the transmission order that has been determined.

The first position may indicate the position of the first or second display side 120-1 or 120-2 in an unfolded condition as shown in FIG. 1A, 1B, 3A or 3B. The second position may indicate the position of the first or second display side 120-1 or 120-2 in a folded condition as shown in FIG. 2 or 4.

The transmission order determiner 137 includes a CPU 132, a register 137-1, a demultiplexer 137-2, an image rotator 137-3, and a display control logic circuit 137-4.

The register 137-1 may generate a selection signal SEL based on configuration information output from the CPU 132. For example, the register 137-1 may be a special function register (SFR), but is not restricted thereto. The register 137-1 may be any type of data storage device that can store the configuration information output from the CPU 132. That is, software or firmware executed by the CPU 132 may set the configuration information in the SFR 137-1. For example, the configuration information may be generated by the CPU 132 according to an operation mode of the current display system 100A or 100B.

For example, the CPU 132 may perform dynamic voltage and frequency scaling (DVFS) based on a detection signal output from the temperature sensor 152, or may adjust the brightness of data displayed on a display side based on a detection signal output from the light sensor 153.

For example, when the current display system 100A or 100B operates in a power-saving mode or low-power mode, the CPU 132 may set configuration information relevant to the generation of the selection signal SEL having a first level (e.g., a low level) in the register 137-1. When, however, the current display system 100A or 100B operates in a mode (e.g., normal mode) for displaying video data, the CPU 132 may set configuration information relevant to the generation of the selection signal SEL having a second level (e.g., a high level) in the register 137-1.

The demultiplexer 137-2 outputs the first data IM1 output from the DMA controller 133 to the image rotator 137-3 or a line buffer 137-5 according to the selection signal SEL. For example, if the current display system 100A or 100B operates in the power-saving mode or the low-power mode, the demultiplexer 137-2 outputs the first data IM1 output from the DMA controller 133 to the line buffer 137-5 in response to the selection signal SEL having the first level or the low level. If, however, the current display system 100A or 100B operates in the normal mode, the demultiplexer 137-2 outputs the first data IM1 output from the DMA controller 133 to the image rotator 137-3 in response to the selection signal SEL having the second level or the high level.

The image rotator 137-3 interprets (or analyzes) the status signal SS output from the status signal generator 135, rotates the first data IM1 according to the interpretation result, and transmits the rotated data, i.e., the second data IM2 to the display control logic circuit 137-4. The image rotator 137-3 may determine a transmission order of the first data IM1 which will be described with reference to FIGS. 7 through 14.

If the status signal SS indicates the first position, the display control logic circuit 137-4 receives the first data IM1 output from the demultiplexer 137-2, writes the first data IM1 to the line buffer 137-5, reads the first data IM1 from the line buffer 137-5 in the order that is the same as the order in which the first data IM1 has been written to the line buffer 137-5, and outputs the first data that has been read as the second data IM2.

In addition, if the status signal SS indicates the second position, the display control logic circuit 137-4 receives the first data IM1 output from the demultiplexer 137-2, writes the first data IM1 to the line buffer 137-5, reads the first data IM1 from the line buffer 137-5 in the order that is reverse to the order in which the first data IM1 has been written to the line buffer 137-5, and outputs the first data that has been read as the second data IM2. The display control logic circuit 137-4 outputs the second data IM2 from the image rotator 137-3 or the second data read from the line buffer 137-5 to the display driver IC 160.

The second data IM2 may be output to the display driver IC 160 using a MIPI® DSI (Mobile Industry Processor Interface Display Serial Interface). Alternatively, the second data IM2 may be output to the display driver IC 160 using embedded DisplayPort (eDP).

Each of the sensors 150, 151, 152, and 153 may be implemented at various positions in at least one of the double-sided displays 101, 103, and 105. For example, the first sensor 150 may detect (or sense) an angle between the display sides 110-1 and 120-1, an orientation of the second double-sided display 103, a rotation of the second double-sided display 103, and/or a rotation direction of the second double-sided display 103 and may generate the detection signal DS according to the detection result. For example, the first sensor 150 may be an accelerator sensor, a gyro sensor, or a combination thereof.

The second sensor 151 may detect sight or an eye or may detect the movement of an eye or pupil and may generate the detection signal DS. The third sensor 152 may detect an ambient temperature of the display system 100A or 100B, generate a detection signal, and transmit the detection signal to the CPU 132. The fourth sensor 153 may detect the ambient brightness of the display system 100A or 100B, generate a detection signal, and transmit the detection signal to the CPU 132. Each of the sensors 150, 151, 152, and 153 may comprise one or more sensors and may be implemented in any place in the display system 100A or 100B.

The status signal generator 135 may receive and interpret the detection signal DS output from one of the first and second sensors 150 and 151 and may output the status signal SS indicating fold or no-fold, rotation or non-rotation, rotation direction, and/or the position of a user's pupil.

The image rotator 137-3 or the display control logic circuit 137-4 may determine the transmission order of the pixels included in the first data IM1 using the status signal SS and may generate the second data IM2 including the pixels transmitted according to the determined transmission order. The display driver IC 160 may display the second data IM2 on a corresponding display side, e.g., the display side 120-1 or 120-2.

FIGS. 6A to 6D are conceptual diagrams of a technique of determining a data transmission order using the line buffer 137-5 illustrated in FIG. 5. When the display system 100A or 100B operates in the power-saving mode or the low-power mode and a clock application is performed, the first data IM1 output from the DMA controller 133 is transmitted to the display control logic circuit 137-4 through the demultiplexer 137-2.

An operation of writing and reading 2-line data or pixels to and from the line buffer 137-5 according to the control of the display control logic circuit 137-4 will be described in detail with reference to FIGS. 6A to 6D.

Figure 6A:
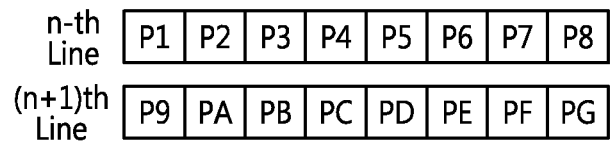
FIGS. 6A-6D are conceptual diagrams of a technique of determining a data transmission order using a line buffer illustrated in FIG. 5.

Referring to FIG. 6A, it is assumed that the n-th line data or pixels include eight pixels P1 through P8 and that the (n+1)-th line data include eight pixels P9, PA, PB, PC, PD, PE, PF, and PG.

Figure 6B:
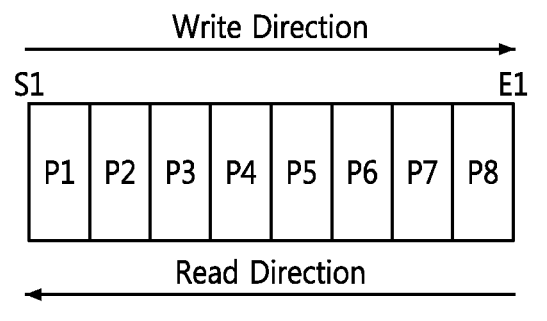

Referring to FIG. 6B, the display control logic circuit 137-4 writes the eight pixels P1 through P8 to the line buffer 137-5 sequentially in a write direction Write Direction, i.e., in a direction from S1 to E1.

According to the status signal SS indicating the second position, the display control logic circuit 137-4 reads the eight pixels P8, P7, P6, P5, P4, P3, P2, and P1 from the line buffer 137-5 sequentially in a read direction Read Direction, i.e., in a direction from E1 to S1, and generates the second data IM2 including the eight pixels P8, P7, P6, P5, P4, P3, P2, and P1 that have been read sequentially. In other words, in order to flip the first data IM1, the display control logic circuit 137-4 reads the pixels P1 through P8 in a direction reverse to the write direction Write Direction. For example, the display control logic circuit 137-4 may read out the pixels P8, P7, P6, P5, P4, P3, P2, and P1 in a last-in, first-out (LIFO) manner.

Figure 6C:
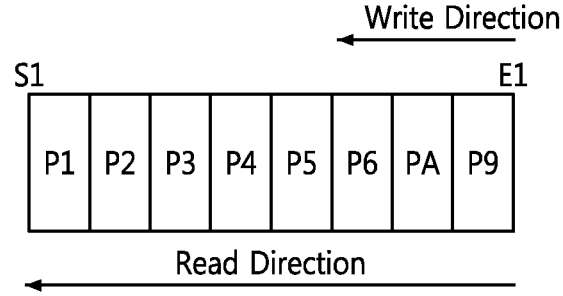

Since the pixels P8, P7, P6, P5, P4, P3, P2, and P1 in the n-th line data are read in the read direction Read Direction, the pixels P9, PA, PB, PC, PD, PE, PF, and PG in the (n+1)-th line are written to the line buffer 137-5 in a write direction Write Direction shown in FIG. 6C.

Figure 6D:
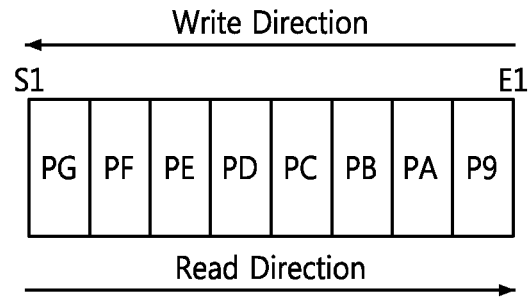

Referring to FIG. 6D, when the pixels P9, PA, PB, PC, PD, PE, PF, and PG in the (n+1)-th line have been completely written in the write direction Write Direction, i.e., in the direction from E1 to S1; the display control logic circuit 137-4 reads the pixels PG, PF, PE, PD, PC, PB, PA, and P9 from the line buffer 137-5 sequentially in a read direction Read Direction, i.e., in the direction from S1 to E1 according to the status signal SS indicating the second position and generates the second data IM2 including the pixels PG, PF, PE, PD, PC, PB, PA, and P9.

Consequently, the display control logic circuit 137-4 may generate the second data IM2 while changing a read direction for each line. At this time, the display control logic circuit 137-4 may generate the second data IM2 while changing the read direction for each line up to the range of update data. The range of update data may be set by the CPU 132 in the register 137-6, e.g., an SFR. Information about the range stored in the register 137-6 may be provided for the DMA controller 133 or the display control logic circuit 137-4. For example, software or firmware executed by the CPU 132 may set the information about the range in the register 137-6.

FIGS. 7 through 14 are conceptual diagrams depicting operations of the image rotator 137-3 for sixteen pixels A-P displaying the letter F when the display system 100A or 100B illustrated in FIG. 1A or 3A rotates or is folded and then rotates. In some embodiments, rotated data may be flipped.

The operations of the image rotator 137-3 that determines a transmission order of the first data IM1 and outputs the second data IM2 corresponding to the transmission order will be described in detail with reference to FIGS. 7 through 14. Here, the status signal generator 135 may generate the status signal SS indicating at least a fold, a rotation direction, a rotation angle, or a movement of a pupil based on the detection signal DS output from the first sensor 150 and/or the second sensor 151. In FIGS. 7 through 14, numbers in square boxes of the first data IM1 transmitted to the image rotator 137-3 may indicate a transmission order. Capital letters A to P may indicate particular pixels or pixel data.

Figure 7A:
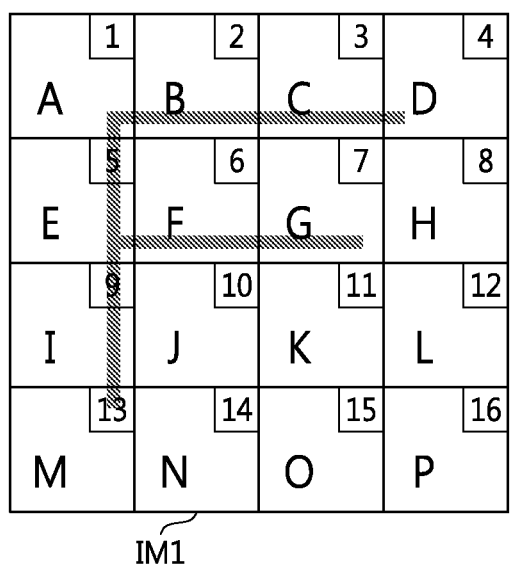
FIGS. 7A and 7B respectively depict a transmission order that first data IM1 is read by an image rotator and an arrangement of second data IM2 generated by an image rotator when a double-sided display is neither folded or rotated according to embodiments disclosed herein.
Figure 7B:
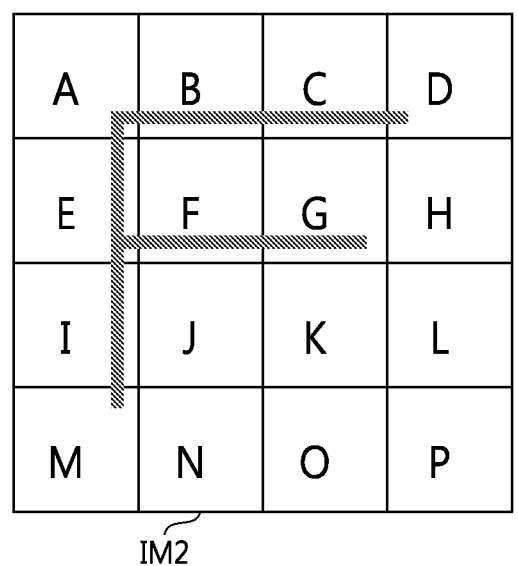
Figure 7C:
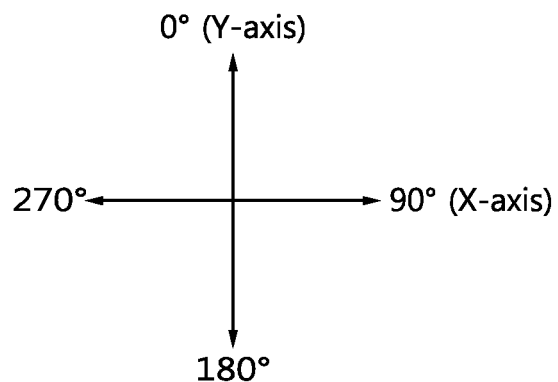
FIG. 7C depicts reference axes X and Y with respect to possible folding or rotational directions of a double-sided display described in connection with FIGS. 7A and 7B.

Referring to FIGS. 7A and 7B, when the double-sided display 103 is neither folded nor rotated with respect to the reference axes X and Y depicted in FIG. 7C, FIG. 7A shows the first data IM1 input to the image rotator 137-3 and FIG. 7B shows the second data IM2 generated by the image rotator 137-3.

Referring to FIGS. 8A to 8C, if the double-sided display 103 is folded and rotated around the X-axis (FIG. 8D) (or if the double-sided display 103 is rotated around the X-axis and then folded), the image rotator 137-3 reads the pixels in the first data IM1 in the read order of the numbers in the square boxes, as shown in FIG. 8A. FIG. 8B shows the arrangement of pixels read in the transmission order or read order. FIG. 8C shows the second data IM2 displayed on the second display side 120-2 if the double-sided display 103 is folded and rotated around the X-axis (or if the double-sided display 103 is rotated around the X-axis and then folded). For example, the second data IM2 may be obtained after being processed by the display control logic circuit 137-4 to look right (like "10:53 PM" in FIGS. 2 and 4) to a user's eyes. FIG. 8D depicts reference axes for determining whether the double-sided display described in FIGS. 8A-8C is folded or rotated.

Referring to FIGS. 9A to 9C, if the double-sided display 103 is folded and rotated around the Y-axis (FIG. 9D) (or if the double-sided display 103 is rotated around the Y-axis and then folded), the image rotator 137-3 reads the pixels in the first data IM1 in the read order of the numbers in the square boxes, as shown in FIG. 9A. FIG. 9B shows the arrangement of pixels read in the transmission order or read order. FIG. 9C shows the second data IM2 displayed on the second display side 120-2 if the double-sided display 103 is folded and rotated around the Y-axis (or if the double-sided display 103 is rotated around the Y-axis and then folded). For example, the second data IM2 may be obtained after being processed by the display control logic circuit 137-4 to look right (like "10:53 PM" in FIGS. 2 and 4) to a user's eyes. FIG. 9D depicts reference axes for determining whether the double-sided display described in FIGS. 9A-9C is folded or rotated.

Figures 10A, 10B, 10C, 10D:
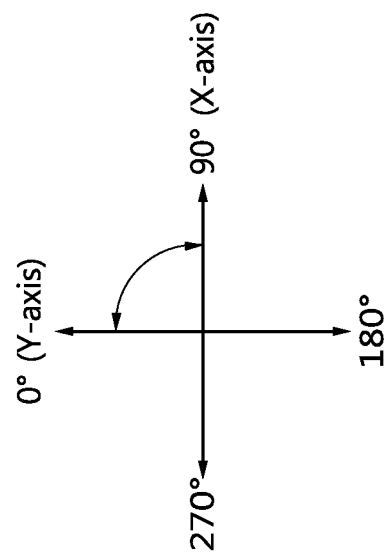
FIGS. 10A-10C respectively depict a transmission order that first data IM1 is read by an image rotator, an arrangement of pixels read in the transmission order, and an arrangement of second data IM2 displayed on a second display side of a double-sided display if the double-sided display is folded and rotated 90 degrees or if the double-sided display is rotated 90 degrees and then folded according to embodiments disclosed herein.
FIG. 10D depicts an indication of a double-sided display being folded and rotated 90 degrees or of the double-sided display being rotated 90 degrees and then folded with respect to reference axes X and Y.

Referring to FIGS. 10A to 10C, if the double-sided display 103 is folded and rotated 90 degrees (or if the double-sided display 103 is rotated 90 degrees and then folded), the image rotator 137-3 reads the pixels in the first data IM1 in the read order of the numbers in the square boxes, as shown in FIG. 10A. FIG. 10B shows the arrangement of pixels read in the transmission order or read order. FIG. 10C shows the second data IM2 displayed on the second display side 120-2 if the double-sided display 103 is folded and rotated 90 degrees (or if the double-sided display 103 is rotated 90 degrees and then folded). For example, the second data IM2 may be obtained after being processed by the display control logic circuit 137-4 to look right (like "10:53 PM" in FIGS. 2 and 4) to a user's eyes. FIG. 10D depicts reference axes for determining whether the double-sided display described in FIGS. 10A-10C is folded or rotated.

Referring to FIGS. 11A to 11C, if the double-sided display 103 is folded and rotated 180 degrees (or if the double-sided display 103 is rotated 180 degrees and then folded), the image rotator 137-3 reads the pixels in the first data IM1 in the read order of the numbers in the square boxes, as shown in FIG. 11A. FIG. 11B shows the arrangement of pixels read in the transmission order or read order. FIG. 11C shows the second data IM2 displayed on the second display side 120-2 if the double-sided display 103 is folded and rotated 180 degrees (or if the double-sided display 103 is rotated 180 degrees and then folded). For example, the second data IM2 may be obtained after being processed by the display control logic circuit 137-4 to look right (like "10:53 PM" in FIGS. 2 and 4) to a user's eyes. FIG. 11D depicts reference axes for determining whether the double-sided display described in FIGS. 11A-11C is folded or rotated.

Referring to FIGS. 12A to 12C, if the double-sided display 103 is folded and rotated 90 degrees and then rotated around the X-axis (not shown) (or if the double-sided display 103 is rotated 90 degrees, rotated around the X-axis, and then folded), the image rotator 137-3 reads the pixels in the first data IM1 in the read order of the numbers in the square boxes, as shown in FIG. 12A. FIG. 12B shows the arrangement of pixels read in the transmission order or read order. FIG. 12C shows the second data IM2 displayed on the second display side 120-2 if the double-sided display 103 is folded and rotated 90 degrees and then rotated around the X-axis (or if the double-sided display 103 is rotated 90 degrees, rotated around the X-axis, and then folded). For example, the second data IM2 may be obtained after being processed by the display control logic circuit 137-4 to look right (like "10:53 PM" in FIGS. 2 and 4) to a user's eyes. FIG. 12D depicts reference axes for determining whether the double-sided display described in FIGS. 12A-12C is folded or rotated.

Referring to FIGS. 13A to 13B, if the double-sided display 103 is folded and rotated 90 degrees and then rotated around the Y-axis (or if the double-sided display 103 is rotated 90 degrees, rotated around the Y-axis, and then folded), the image rotator 137-3 reads the pixels in the first data IM1 in the read order of the numbers in the square boxes, as shown in FIG. 13A. FIG. 13B shows the arrangement of pixels read in the transmission order or read order. FIG. 13C shows the second data IM2 displayed on the second display side 120-2 if the double-sided display 103 is folded and rotated 90 degrees and then rotated around the Y-axis (or if the double-sided display 103 is rotated 90 degrees, rotated around the Y-axis, and then folded). For example, the second data IM2 may be obtained after being processed by the display control logic circuit 137-4 to look right (like "10:53 PM" in FIGS. 2 and 4) to a user's eyes.

Referring to FIGS. 14A to 14C, if the double-sided display 103 is folded and rotated 270 degrees (or if the double-sided display 103 is rotated 270 degrees and then folded), the image rotator 137-3 reads the pixels in the first data IM1 in the read order of the numbers in the square boxes, as shown in FIG. 14A. FIG. 14B shows the arrangement of pixels read in the transmission order or read order. FIG. 14C shows the second data IM2 displayed on the second display side 120-2 when the double-sided display 103 is folded and rotated 270 degrees (or when the double-sided display 103 is rotated 270 degrees and then folded). For example, the second data IM2 may be obtained after being processed by the display control logic circuit 137-4 to look right (like "10:53 PM" in FIGS. 2 and 4) to a user's eyes.

FIG. 15 is a flowchart of an exemplary embodiment of a method of operating the display system 100A or 100B illustrated in FIG. 1A or 3A according to some embodiments disclosed herein.

Referring to FIGS. 1 through 15, the DMA controller 133 reads the first data IM1 from the memory 140 in operation S110. The first data IM1 that has been read may be stored in an internal memory of the DMA controller 133. At least one of the first and second sensors 150 and 151 detects at least one among fold and rotation of the display system 100A or 100B and movement of a user's pupil and generates the detection signal DS in operation S112.

The status signal generator 135 interprets the detection signal DS output from the at least one of the first and second sensors 150 and 151, generates the status signal SS according to the interpretation result, and outputs the status signal SS to the image rotator 137-3 and the display control logic circuit 137-4 in operation S114.

The image rotator 137-3 or the display control logic circuit 137-4 determines a transmission order (or read order) of pixels included in the first data IM1 output from the demultiplexer 137-2 based on the status signal SS in operation S116. The image rotator 137-3 or the display control logic circuit 137-4 outputs the second data IM2 including the pixels generated in the transmission order (or read order) that has been determined in operation S118.

The display driver IC 160 displays the second data IM2 output from the transmission order determiner 137 on the first or second display side 120-1 or 120-2 in operation S120. Therefore, the user can always see data rightly on any one of a plurality of display sides included in the display system 100A or 100B.

As described above, according to some embodiments disclosed herein, an AP or a SoC determines a transmission order of data according to at least one among fold and rotation of a double-sided display and movement of a user's pupil based on a detection signal output from a sensor.

FIG. 16 depicts an exemplary arrangement of system components of a System on a Chip (SOC) 1600 that comprises one or more processing circuits according to the subject matter disclosed herein. The exemplary arrangement of SOC 1600 comprises one or more central processing units (CPUs) 1601, one or more graphical processing units (GPUs) 1602, one or more areas of glue logic 1603, one or more analog/mixed signal (AMS) areas 1604, and one or more Input/Output (I/O) areas 1605. One or more of the different exemplary system components of SOC 1600 may comprise one or more processing circuits according to the subject matter disclosed herein. It should be understood that other arrangements of SOC 1600 are possible and that SOC 1600 could comprise other system components than those depicted in FIG. 16. SOC 1600, which may comprise one or more processing circuits according to the subject matter disclosed herein, may be used in various types of electronic devices, such as, but not limited to, a computing device, a personal digital assistant (PDA), a laptop computer, a mobile computer, a web tablet, a wireless phone, a cell phone, a smart phone, a digital music player, or a wireline or wireless electronic device.

FIG. 17 depicts a block diagram illustrating an exemplary mobile device 1700 comprising one or more doubled-sided displays and processing circuits according to exemplary embodiments disclosed herein. Referring to FIG. 17, a mobile device 1700 may comprise a processor 1710, a memory device 1720, a storage device 1730, a display device 1740, a power supply 1750 and an image sensor 1760. The mobile device 1700 may further comprise ports that communicate with a video card, a sound card, a memory card, a USB device, other electronic devices, etc.

The processor 1710 may perform various calculations or tasks. According to exemplary embodiments, the processor 1710 may be a microprocessor or a CPU. The processor 1710 may communicate with the memory device 1720, the storage device 1730, and the display device 1740 via an address bus, a control bus, and/or a data bus 1770. In some exemplary embodiments, the processor 1710 may be coupled to an extended bus, such as a peripheral component interconnection (PCI) bus or a PCI Express (PCIe) bus. The memory device 1720 may store data for operating the mobile device 1700. For example, the memory device 1720 may be implemented with, but is not limited to, a dynamic random access memory (DRAM) device, a mobile DRAM device, a static random access memory (SRAM) device, a phase-change random access memory (PRAM) device, a ferroelectric random access memory (FRAM) device, a resistive random access memory (RRAM) device, and/or a magnetic random access memory (MRAM) device. The memory device 1620 comprises a magnetic random access memory (MRAM) according to exemplary embodiments disclosed herein. The storage device 1730 may comprise a solid-state drive (SSD), a hard disk drive (HDD), a CD-ROM, etc. The display device 1740 may comprise a touchscreen display. In an alternative exemplary embodiment, the display device 1740 may comprise one or more double-sided displays and processing circuits disclosed herein. The mobile device 1700 may further include an input device (not shown), such as a touchscreen different from display device 1740, a keyboard, a keypad, a mouse, etc., and an output device, such as a printer, a display device, etc. The power supply 1750 supplies operation voltages for the mobile device 1700.

The image sensor 1760 may communicate with the processor 1710 via the buses or other communication links. The image sensor 1760 may be integrated with the processor 1710 in one chip, or the image sensor 1760 and the processor 1710 may be implemented as separate chips.

At least a portion of the mobile device 1700 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP). The mobile device 1700 may be a digital camera, a mobile phone, a smart phone, a portable multimedia player (PMP), a personal digital assistant (PDA), a computer, a tablet, etc.

FIG. 18 depicts an exemplary embodiment of an article of manufacture 1800 comprising a non-transitory computer-readable storage medium 1801 having stored thereon computer-readable instructions that, when executed by a computer-type device, results in any of the various techniques and methods according to the subject matter disclosed herein. Exemplary computer-readable storage mediums that could be used for computer-readable storage medium 1801 could be, but are not limited to, a semiconductor-based memory, an optically based memory, a magnetic-based memory, or a combination thereof.

In addition, according to some embodiments disclosed herein, a display system including a double-sided display determines a transmission order of data according to at least one among fold and rotation of a double-sided display and movement of a user's pupil based on a detection signal output from a sensor, thereby allowing the user to see the data always displayed in one direction regardless of which side of the double-sided display the data is displayed on.

While the subject matter disclosed herein has been particularly shown and described with reference to exemplary embodiments thereof, it will be understood by those of ordinary skill in the art that various changes in forms and details may be made therein without departing from the spirit and scope of the subject matter as defined by the following claims.

What is claimed is:

1. A system, comprising:
   a status signal generator configured to output a status signal to indicate one of a plurality of positions of at least one double-sided display; and
   an image rotator coupled to the status signal, the image rotator configured to receive image data in a read order, and to output the image data in a transmission order, the transmission order being the same as the read order if the status signal indicates a first position of the at least one double-sided display, and the transmission order being a reverse of the read order if the status signal indicates a second position of the at least one double-sided display.

2. The system according to claim 1, wherein the plurality of positions of the at least one double-sided display comprises an unfolded position and a folded position, and
   wherein the first position comprises the unfolded position and the second position comprises the folded position.

3. The system according to claim 1, wherein the at least one double-sided display comprises a double-sided display, a transparent double-sided display, a double-sided foldable display, a dual-sided foldable display, a double-sided foldable flexible display, or a dual-sided foldable flexible display.

4. The system according to claim 1, wherein the at least one double-sided display comprises at least two double-sided displays.

5. The system according to claim 4, wherein the status signal generator is further configured to output the status signal in response to at least one of an angle between the at least two double-sided displays, an orientation of one of the at least two double-sided displays, a rotation of one of the at least two double-sided displays or a rotation direction of one of the at least two double-sided displays.

6. The system according to claim 1, further comprising:
   a direct memory access (DMA) controller comprising an output coupled to the image rotator, the DMA controller being configured to output the image data to the image rotator; and
   a display driver IC configured to receive the image data.

7. The system according to claim 1, wherein the system comprises part of an electronic device comprising the at least one double-sided display.

8. A System on a Chip (SOC), comprising:
- a direct memory access (DMA) controller configured to output image data in a read order;
- a status signal generator configured to output a status signal to indicate one of a plurality of positions of at least one double-sided display, the plurality of positions comprising at least an unfolded position and a folded position, and a first position comprising the unfolded position and a second position comprising the folded position; and
- an image rotator coupled to the status signal generator, the image rotator configured to receive the image data in the read order, and to output the image data in a transmission order, the transmission order being the same as the read order if the status signal indicates the first position of the at least one double-sided display, and the transmission order being a reverse of the read order if the status signal indicates the second position of the at least one double-sided display.

9. The SoC according to claim 8, wherein the at least one double-sided display comprises a double-sided display, a transparent double-sided display, a double-sided foldable display, a dual-sided foldable display, a double-sided foldable flexible display, or a dual-sided foldable flexible display.

10. The SoC according to claim 8, wherein the at least one double-sided display comprises at least two double-sided displays.

11. The SoC according to claim 10, wherein the status signal generator is further configured to output the status signal in response to at least one of an angle between the at least two double-sided displays, an orientation of one of the at least two double-sided displays, a rotation of one of the at least two double-sided displays or a rotation direction of one of the at least two double-sided displays.

12. The SoC according to claim 8, further comprising a display driver configured to receive the image data from the image rotator and to drive the at least one double-sided display with the image data received from the image rotator.

13. The SoC according to claim 8, wherein the SoC comprises part of an electronic device comprising the at least one double-sided display.

14. The SoC according to claim 13, wherein the electronic device comprises a computing device, a personal digital assistant (PDA), a laptop computer, a mobile computer, a web tablet, a wireless phone, a cell phone, a smart phone, a digital music player, or a wireline or wireless electronic device.

15. A system, comprising:
- at least one double-sided display;
- a status signal generator configured to output a first status signal to indicate an unfolded position of the at least one double-sided display and a second status signal to indicate a folded position of the at least one double-sided display; and
- an image rotator coupled to the status signal generator, the image rotator configured to receive image data in a read order, and to output the image data in a transmission order, the transmission order being the same as the read order if the status signal generator outputs the first position signal, and the transmission order being a reverse of the read order if the status signal generator outputs the second position signal.

16. The system according to claim 15, wherein the at least one double-sided display comprises a double-sided display, a transparent double-sided display, a double-sided foldable display, a dual-sided foldable display, a double-sided foldable flexible display, or a dual-sided foldable flexible display.

17. The system according to claim 15, wherein the at least one double-sided display comprises at least two double-sided displays.

18. The system according to claim 17, wherein the status signal generator is further configured to output the first status signal or the second status signal in response to at least one of an angle between the at least two double-sided displays, an orientation of one of the at least two double-sided displays, a rotation of one of the at least two double-sided displays or a rotation direction of one of the at least two double-sided displays.

19. The system according to claim 15, wherein the system comprises part of an electronic device comprising the at least one double-sided display.

20. The system according to claim 19, wherein the electronic device comprises a computing device, a personal digital assistant (PDA), a laptop computer, a mobile computer, a web tablet, a wireless phone, a cell phone, a smart phone, a digital music player, or a wireline or wireless electronic device.

* * * * *